United States Patent
Schreiner et al.

(10) Patent No.: US 6,312,249 B1
(45) Date of Patent: *Nov. 6, 2001

(54) DIE CLOSING DEVICE OF AN INJECTION MOLDING MACHINE

(75) Inventors: Helmut Schreiner, Nürnberg; Ernst Würl, Höttingen, both of (DE)

(73) Assignee: Mannesmann Aktiengesellschaft, Düsseldorf (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,734

(22) Filed: Oct. 3, 1997

(30) Foreign Application Priority Data

Oct. 9, 1996 (DE) ................................. 196 43 86

(51) Int. Cl.[7] ................................. B29C 45/64
(52) U.S. Cl. ................. 425/592; 100/281; 425/451.5
(58) Field of Search .................... 425/592, 593, 425/451.5, 451.6; 100/258 A, 281

(56) References Cited

U.S. PATENT DOCUMENTS

| | | | | |
|---|---|---|---|---|
| 2,233,354 | * | 2/1941 | Thilenius ........................ | 425/592 |
| 3,768,952 | * | 10/1973 | Connolly ....................... | 425/451.5 |
| 3,840,317 | * | 10/1974 | Koch et al. .................... | 425/451.6 |
| 3,877,861 | * | 4/1975 | Keifer et al. ................... | 425/451.5 |
| 4,120,636 | * | 10/1978 | Appel et al. ................... | 425/451.6 |
| 4,222,731 | * | 9/1980 | Enrietti et al. ................. | 425/451.5 |
| 4,337,026 | * | 6/1982 | Taubenmann et al. ........ | 425/451.5 |
| 5,104,308 | * | 4/1992 | Morton et al. ................. | 425/593 |
| 5,511,963 | * | 4/1996 | Hehl ............................... | 425/593 |

FOREIGN PATENT DOCUMENTS

| | | |
|---|---|---|
| 1 704 064 | 4/1971 | (DE). |
| 43 08 962 | 9/1994 | (DE). |
| 44 11 649 | 4/1995 | (DE). |
| 295 13 862 | 2/1996 | (DE). |
| 0 554 068 | 8/1993 | (EP). |
| 55 40 68 | 8/1993 | (EP). |
| 2 012 206 | 7/1979 | (GB). |

* cited by examiner

*Primary Examiner*—James P. Mackey
(74) *Attorney, Agent, or Firm*—Cohen, Pontani, Lieberman & Pavane

(57) ABSTRACT

A die closing device of an injection molding machine includes a stationary die clamping plate, a movable die clamping plate, and a toggle lever pair connecting the clamping plates. The toggle lever pair includes a first connecting rod and a second connecting rod, the first connecting rod being pivotally connected to the stationary die clamping plate, and the second connecting rod being pivotally connected between the first rod and the movable die clamping plate. The device further includes a powered driver operable for imparting motion to at least one of the first and second connecting rods to controllably move the movable die clamping plate relative to the stationary plates to open and close the die.

15 Claims, 5 Drawing Sheets

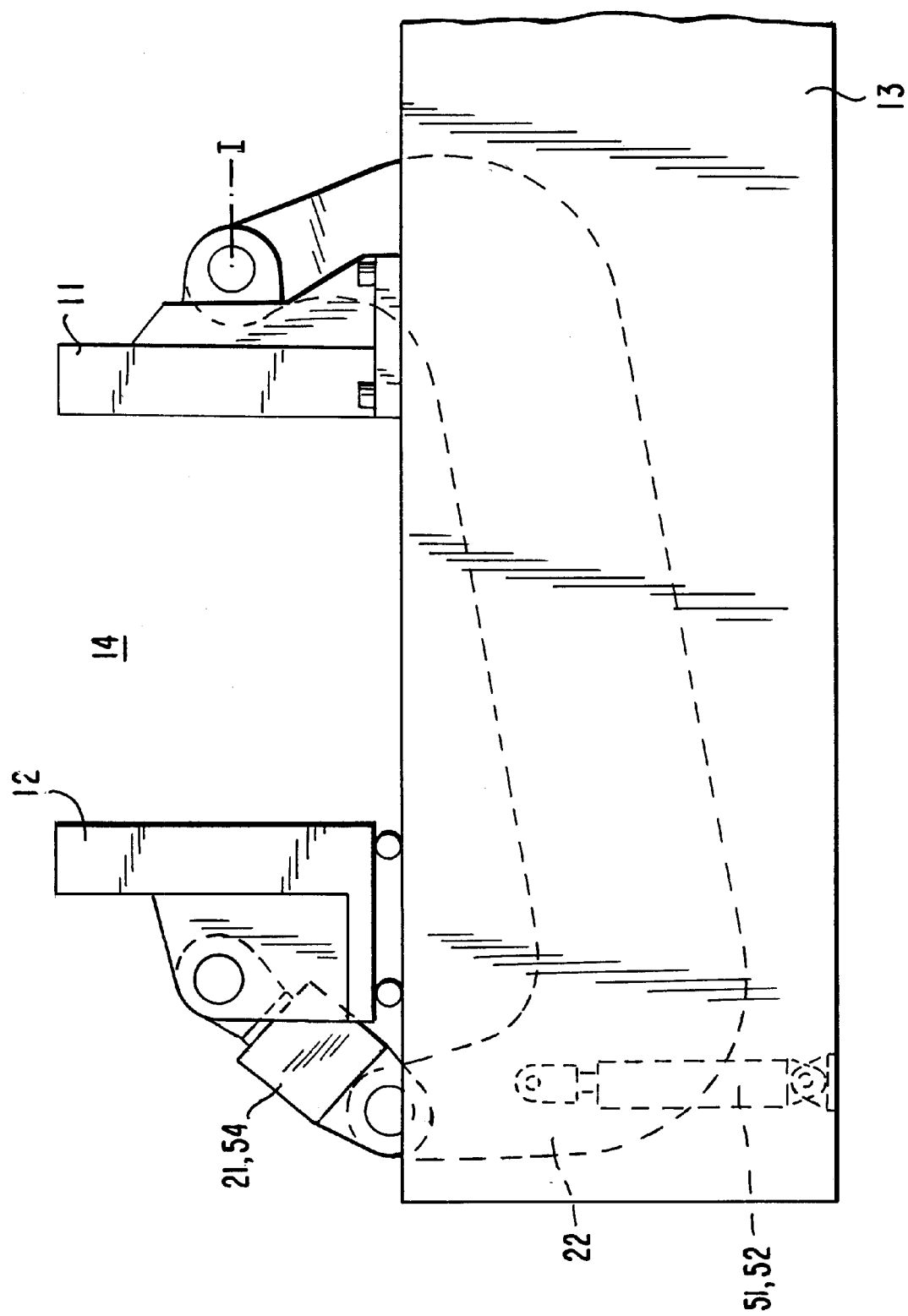

DIE CLOSING DEVICE OF AN INJECTION MOLDING MACHINE

BACKGROUND OF THE INVENTION

1. Field of the Invention

The present invention relates to injection molding machines and, more particularly, to a die closing device which has a stationary die backplate or clamping plate and a movable die clamping plate driven by a toggle lever.

2. Discussion

Injection molding machines generally have a movable die clamping plate and at least one stationary die clamping plate. Depending on the driving means, such so-called two-platen machines can be used, although the driving means may itself be supported on a third auxiliary plate.

When two-platen machines without tie bars are employed, an important consideration is the parallelism of the mold, i.e. the correspondence or coordination of the die clamping plates. German patent publication DE 43 08 962 A1 discloses an injection molding machine wherein force transmission elements are constructed as separate deformation elements in the form of stirrups. The support plate is mounted at the machine base for movement in the closing direction.

Due to repeated deformations in normal use, the elements of these machines are subject to extensive wear and thus have a short service life. Furthermore, the deformation is force-dependent and the parallelism of the mold is, accordingly, not always provided.

European Publication 0 554 068 discloses an injection molding machine with a closing device wherein the stationary and movable die clamping plates are connected to each other through stirrups or clips and the force is imparted through the principal axis of the machine.

When a toggle lever drive is used for the closing device, a support plate is used as a third plate.

SUMMARY OF THE INVENTION

It is an object of the invention to provide a low-wear and reliable mold or die closing device which includes a mechanism to ensure that the die clamping plates of the device maintain a high degree of parallelism.

In a presently preferred embodiment, the die closing device of a mold injection machine comprises a stationary die clamping plate and a movable die clamping plate driven by a toggle lever assembly. The toggle lever assembly includes first and second connecting rods. The first connecting rod is pivotally connected to the stationary die clamping plate, and the second connecting rod is pivotally connected to the first connecting rod at one end and to the movable die clamping plate at another end. A drive unit is connected to the first and/or second connecting rods for operatively opening and closing the mold by controlling the motion of the movable die clamping plate.

In another embodiment, the die closing device has at least one toggle lever pair or assembly which includes a first connecting rod that is pivotally connected with the stationary die clamping plate and a second connecting rod that is pivotally connected with the movable die clamping plate. A drive unit is coupled to at least a portion of the toggle lever pair for operatively opening and closing the die or mold. The toggle lever drive is connected, as by a connecting rod, at both ends to the closing device and directly connects the stationary die clamping plate with the movable die clamping plate in a frictional engagement. The connecting rod may be constructed as a cross-beam or substantially C-shaped member.

In still another embodiment, a rotary drive or a linear force unit is provided as the driving means for moving the toggle lever pair. This drive unit can be arranged between one of the connecting rods and the machine bed or die clamping plate or between the two connecting rods.

When a rotary drive is used, the rotary drive acts on one of the shafts connected with the connecting rods and can be supported on a die clamping plate—preferably at the movable die clamping plate—or may alternatively be provided between the two connecting rods of the toggle lever pair.

In yet another embodiment, the shaft is constructed as an eccentric member. In this manner, the closing device can be operated with a rotary drive or a linear drive unit using only a small force so that the closing force is applied by way of simple rotation of the eccentric.

In still another embodiment, the eccentric is arranged so that the closing operation of the closing device, including the application of the closing force, is carried out in a pivotal movement of a connecting rod. In both of the aforementioned embodiments, the eccentric may be driven by an electric drive.

The eccentricity e is dependent upon the total stroke or lift H and is in the range of $e = 0.005\,H$ to $0.02\,H$.

In accordance with another advantageous construction, a spacer or distancer may be arranged between the die clamping plate and the toggle lever drive. The spacer may be constructed as a piston-cylinder unit, e.g. a short-stroke cylinder, and serves substantially to apply the closing force. The closing force can be monitored in a particularly simple manner such, for example, as through a closed loop control mechanism. Thus, with respect to the required closing force, the system is free from such changes in the mechanical system as those results, by way of example, from wear or longitudinal deformations of the connecting rods, particularly of the cross-beam or of the longer C-shaped connecting rod or toggle lever member.

In addition to the spacer, a stroke-adjusting device may be provided for adjusting the die stroke. The spacer may also be constructed for use in adjusting the die stroke and, in addition, in applying the closing force.

In a still further embodiment, one of the connecting rods is constructed as a linear force unit; the toggle lever pair may be connected to a rotary drive or a linear drive for this purpose. The structural connection between the connecting rod and the die clamping plate can be constructed in a particularly simple manner.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. Moreover, the drawings are not drawn to scale and, as such, are merely conceptual in disclosing the preferred embodiments of the invention.

BRIEF DESCRIPTION OF THE DRAWINGS

In the drawings, wherein like reference characters denote similar elements throughout the several views:

FIG. 1b is a top view of the embodiment of FIG. 1a;

FIG. 3b is a top view of the embodiment of FIG. 3a; and

FIG. 4 is a side view of still another embodiment of the inventive die closing device including a connecting rod and a linear mechanical drive.

DETAILED DESCRIPTION OF THE PRESENTLY PREFERRED EMBODIMENTS

Figure 1A:
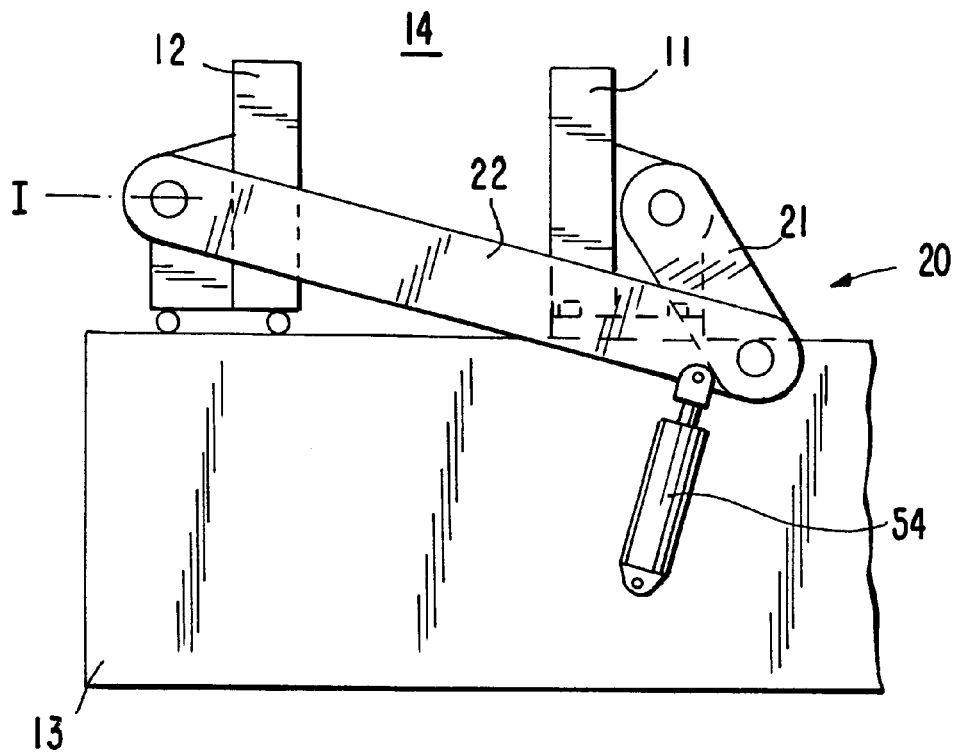
FIG. 1a is a side view of a first embodiment of the inventive die closing device with a cross-beam.
Figure 1B:
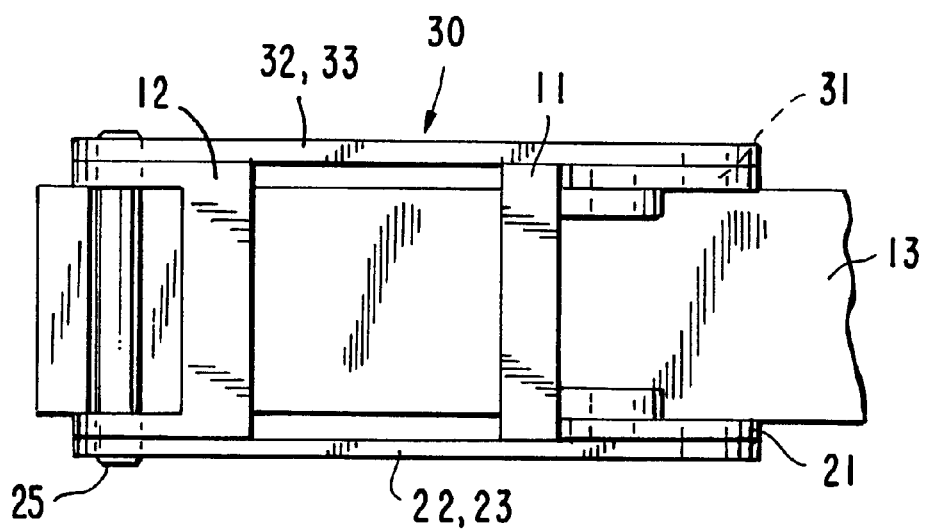

FIGS. 1a and 1b depict a first embodiment of a die closing device 14 in accordance with the invention of an injection molding machine and supported on a machine bed 13. The device 14 includes a stationary die clamping plate 11 affixed to the machine bed 13 and a movable die clamping plate 12 that is movably displaceable relative to the clamping plate 11. The movable die clamping plate 12 may, by way of example, be rollingly, slidably, or frictionally supported on the machine bed 13. As shown in FIG. 1b, the inventive device 14 includes a first toggle lever pair or drive 20 and, preferably, a second toggle lever pair 30 for controlling movement of the movable clamping plate 12 relative to the stationary clamping plate 11.

As seen in FIGS. 1a and 1b, the first toggle lever pair 20 includes a first connecting rod 21 and a second connecting rod 22. The first connecting rod 21 is pivotally connected, as for example through shafts or pins, to the stationary die clamping plate 11 at one end and to the second connecting rod 22 at the other. Similarly, the second toggle lever pair 30 includes a first connecting rod 31 and a second connecting rod 32 wherein the first connecting rod 31 is pivotally connected, as for example by shafts or pins, to the stationary die clamping plate 12 at one end and to the second connecting rod 32 at the other.

The second connecting rods 22, 32 may be implemented in the form of cross-beams 23, 33 which have the basic shape of an elongated strip with pins or shafts at the joints. Each of the cross-beams 23, 33 has a first and a second end and is so dimensioned that the stationary and movable die clamping plates 11, 12 are disposed between the first and second ends of the cross-beams 23, 33.

To impart controlled linear motion to the movable clamping plate 12, a piston cylinder unit 54 is arranged so that one end of piston unit 54 is coupled to one of the toggle lever pairs 20, 30 by attachment to the second connecting rod 22 or 32 through, for example, pins or shafts, and so that the other end of the piston cylinder unit 54 is pivotally secured to the machine bed 13. The piston cylinder 54 may be driven hydraulically or electrically or by any other suitable driving means.

Figure 2A:
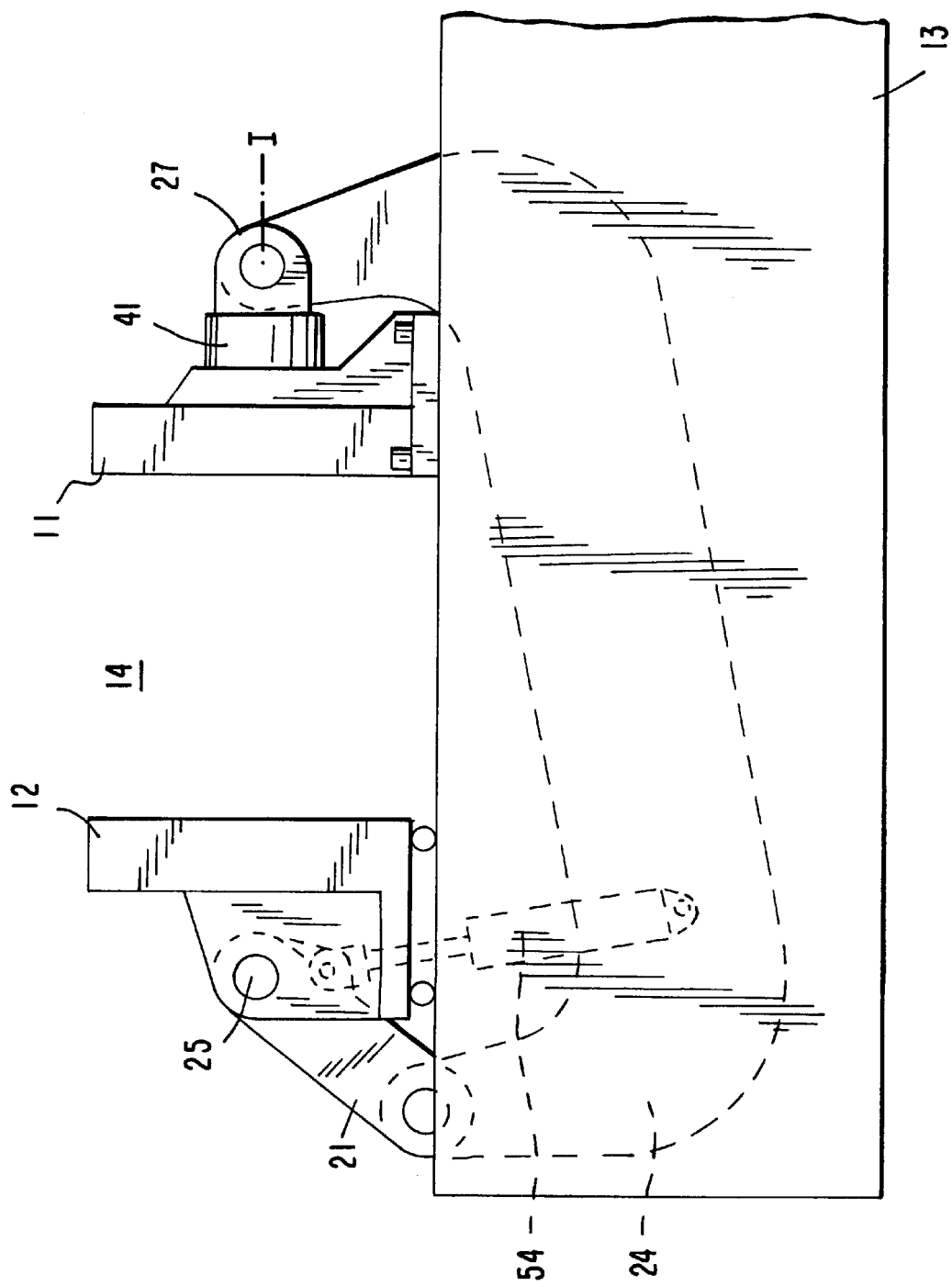
FIG. 2a is a side view of another embodiment of the inventive die closing device with a spacer at the stationary clamping plate.
Figure 2B:
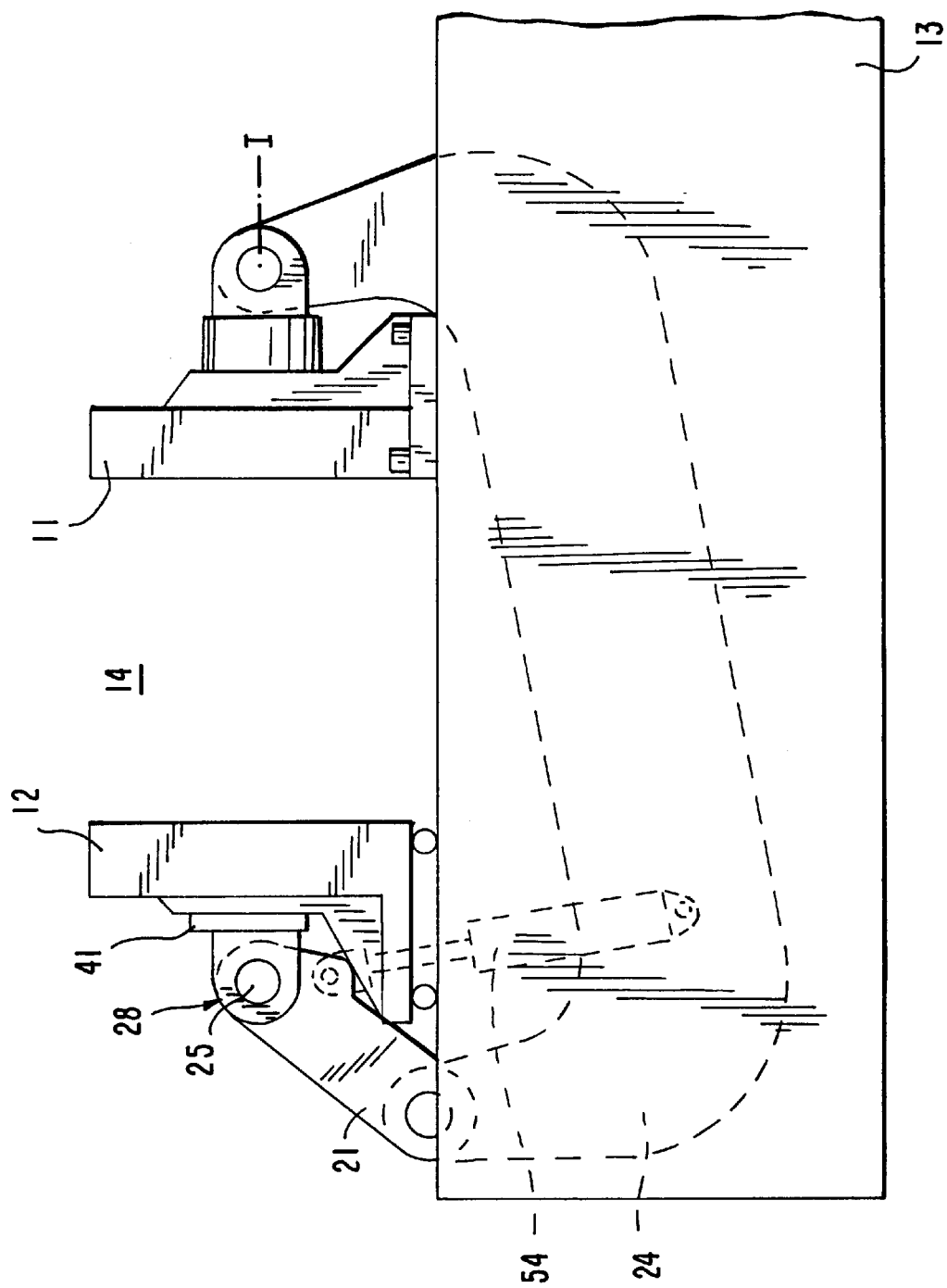
FIG. 2b is a side view of still another embodiment of the inventive die closing device with a spacer at the movable clamping plate.

FIG. 2a illustrates another embodiment of the die closing device. In this alternate embodiment, the piston unit 54 is pivotally attached to the first connecting rod 21 and the second connecting rod 24 is substantially C-shaped. The C-shaped connecting rod 24 is preferably dimensioned so that the stationary and movable die clamping plates 11, 12 are disposed between opposed first and second ends of rod 24 and is guided until or up to the region of the central axis (I) of the plates 11, 12. Preferably, rod 24 is guided so as to impart motion to the movable clamping plate 12 substantially along the central axis (I). Also shown in FIG. 2a is a spacer 41 disposed between the stationary die clamping plate 11 and the head end 27 of the C-shaped connecting rod 24. FIG. 2b similarly depicts a modified embodiment in which the head end 28 of rod 21 is pivotally attached to a spacer 41 disposed at the movable clamping plate 12. The spacer 41 may be adjusted to a length (L) appropriate for developing the desired closing force. Spacer 41 may be implemented as a short-stroke cylinder and may include a hydraulic or electrical drive mechanism for varying the length of the spacer.

Figure 3A:
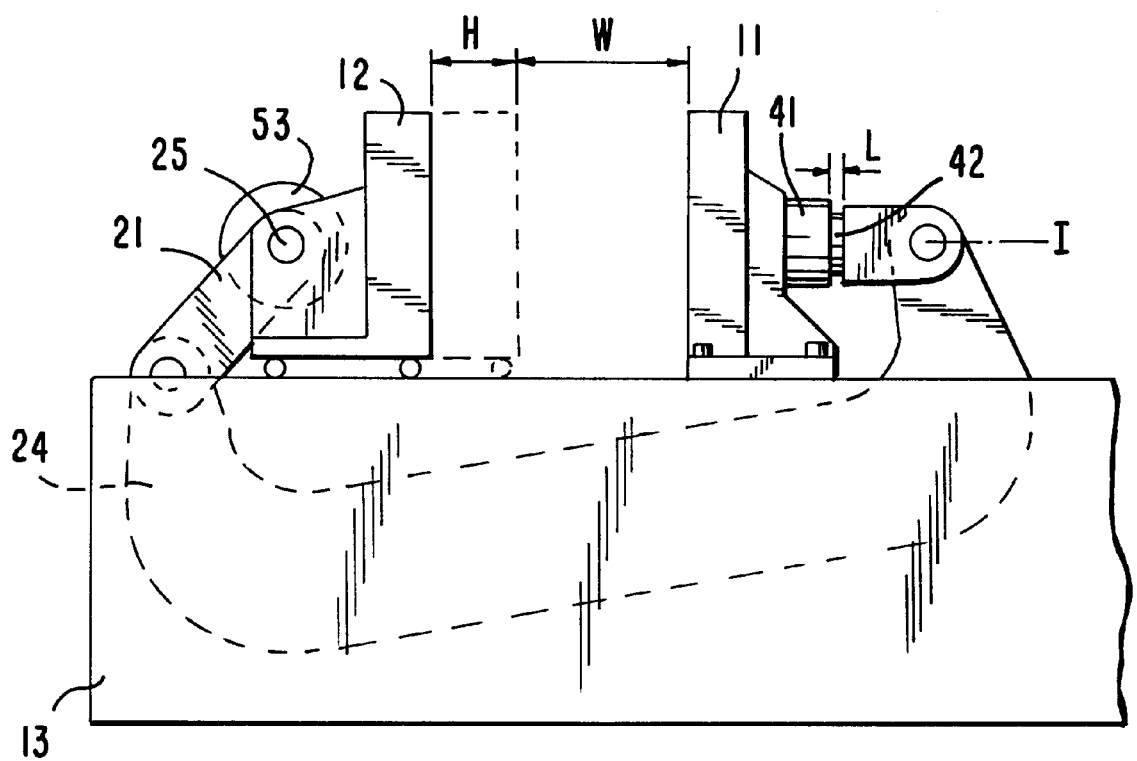
FIG. 3a is a side view of yet another embodiment of the inventive die closing device with a rotary drive, a spacer, and a die stroke adjusting device.
Figure 3B:
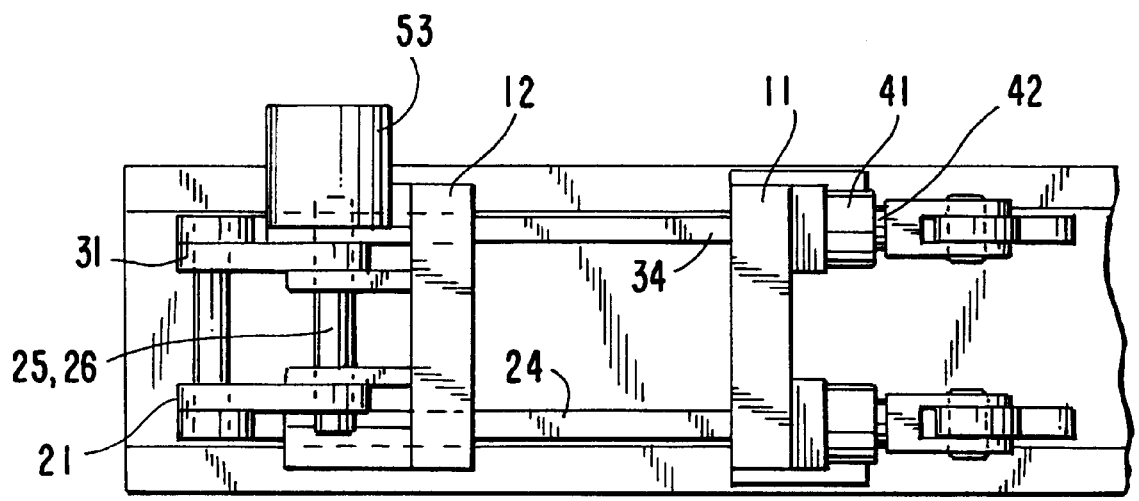

FIGS. 3a and 3b illustrate another embodiment of the inventive die closing device having a stroke-adjusting device 42. The stroke-adjusting device 42 may be connected between one of the clamping plates 11, 12 and one of the connecting rods 21, 24 for operatively varying the minimum spacing between the stationary and movable clamping plates 11, 12 in the fully closed condition of the die. As shown, the stroke-adjusting device 42 selectively varies the stroke of the die by adjusting the relative distance between the movable and stationary clamping plates 11, 12, and is arranged between the second connecting rod 24 and the stationary die clamping plate 11 adjacent to the spacer 41. As there seen, the spacer 41 and stroke adjusting device 42 may form an integral unit.

Also shown in FIGS. 3a and 3b is a rotary drive 53 that forms a drive unit and is connected to the first connecting rod 21 through a shaft or pin 25. The rotary drive 53 and shaft 25 are so arranged that drive 53 acts on shaft 25 to impart motion to the connecting rods 21, 24. The rotary drive 53 may be electrically driven.

The total stroke H, which serves as a base measurement for the eccentricity e when the shaft 25 defines an eccentric 26, is shown in the upper portion of FIG. 3a. The eccentric 26 which is connected to the rotary drive 53 is not shown in more detail. The spacer 41 may be omitted when an eccentric 26 is present. The eccentricity e is dependent upon the total stroke H and is preferably in the range of e=0.005 H to 0.02 H.

FIG. 4 depicts yet another embodiment of the present invention in which the drive unit is shown as a linear movable force device 51 in the illustrative form of a movable spindle 52 that may be electrically or hydraulically driven. In this embodiment the first connecting rod 21 is constructed as a piston-cylinder unit 54 that may be electrically or hydraulically driven. The articulated connection between the second connecting rod 22 and the stationary die clamping plate 11 can be constructed in a simple manner.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same result are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A die closing device of an injection molding machine, comprising:

a stationary die clamping plate;

a movable die clamping plate movable relative to said stationary die clamping plate for varying a spacing between said stationary and movable clamping plates, said stationary plate being arranged in a plane and said movable plate being arranged in a plane;

a toggle lever assembly, comprising:

a first connecting rod having opposed first and second ends, and said first end being pivotally connected to said stationary clamping plate; and a second connecting rod having opposed first and second ends, said second rod first end being pivotally connected to said first rod second end and said second rod second end being pivotally connected to said movable die clamping plate;

means connected to one of said first and second connecting rods for driving said one of said first and second rods to move said movable die clamping plate relative to said stationary plate and thereby vary the spacing between the stationary and movable die clamping plates for opening and closing the die closing device while maintaining the plane of the movable plate substantially parallel to the plane of the stationary plate;

a spacer having an adjustable length and connected between one of said stationary and movable die clamping plates and the end of the connecting rod pivotally connected to said one of the clamping plates; and driving means for operatively varying the length of said spacer so that the spacer exerts a desired closing force.

2. The die closing device of claim 1, wherein said second connecting rod is substantially C-shaped and dimensioned so that said stationary and movable die clamping plates are disposed between said first and second ends of said second connecting rod.

3. The die closing device 1, wherein said driving means for operatively varying the length of said spacer comprises one of hydraulic and electrical driving means for varying the length of the spacer.

4. The die closing device of claim 1, further comprising a stroke-adjusting device connected between one of said clamping plates and one of said connecting rods for operatively varying a minimum spacing between said stationary and movable clamping plates in a fully closed condition of the die closing device.

5. The die closing device of claim 3, wherein said spacer further comprises a stroke-adjusting device connected between said one of said clamping plates and one of said connecting rods for operatively varying a minimum spacing between said stationary and movable clamping plates in a fully closed condition of the die closing device.

6. The die closing device of claim 1, further comprising a shaft defining the pivotal connection of one of said ends of one of said connecting rods to one of said clamping plates, and wherein said driving means comprises a rotary drive means connected to said shaft and operable for rotating the shaft so as to impart motion to said connecting rods for opening and closing the die closing device.

7. The die closing device of claim 6, wherein said rotary drive means comprises an electrically driven rotary drive.

8. The die closing device of claim 1, wherein said driving means comprises a linear movement force-transfer device connected with at least one of said connecting rods.

9. The die closing device of claim 8, wherein said driving means comprises an electrically movable spindle.

10. The die closing device of claim 4, wherein the spacer and the stroke-adjusting device are connected so as to form a constructional and functional unit.

11. A die closing device of an injection molding machine, comprising:

a stationary die clamping plate;

a movable die clamping plate movable relative to said stationary die clamping plate for varying a spacing between said stationary and movable clamping plates, said stationary plate being arranged in a plane and said movable plate being arranged in a plane;

a toggle lever assembly, comprising:

a first connecting rod having opposed first and second ends, said first end being pivotably connected to said stationary clamping plate; and a second connecting rod having opposed first and second ends, said second rod first end being pivotably connected to said first rod second end and said second rod second end being pivotably connected to said movable die clamping plate;

means connected to one of first said and second connecting rods for driving said one of said first and second rods to move said movable die clamping plate relative to said stationary plate and thereby vary the space in between the stationary and movable die clamping plates for opening and closing the die closing device while maintaining the plane of the movable plate substantially parallel to the plane of the stationary plate; and a shaft defining the pivotable connection of one of said ends of one of said connecting rods to one of said clamping plates, said driving means comprising a rotary drive means connected to said shaft and operable for rotating the shaft so as to impart motion to said connecting rods for opening and closing the die closing device, the shaft having an eccentric for applying a closing force.

12. The die closing device of claim 11, wherein said second connecting rod is substantially C-shaped and dimensioned so that said stationary and movable die clamping plates are disposed between said first and second ends of said second connecting rod.

13. The die closing device of claim 11, wherein said rotary drive means comprises an electrically driven rotary drive.

14. The die closing device of claim 11, wherein said driving means comprises a linear movement force-transfer device connected with at least one of said connecting rods.

15. The die closing device of claim 14, wherein said driving means comprises an electrically movable spindle.

* * * * *